United States Patent [19]

Blechschmidt

[11] Patent Number: 5,161,055

[45] Date of Patent: Nov. 3, 1992

[54] ROTATING WINDOW

[76] Inventor: Wolf J. Blechschmidt, 16421 NE. 18th St., Bellevue, Wash. 98008

[21] Appl. No.: 753,807

[22] Filed: Sep. 3, 1991

[51] Int. Cl.$^5$ .................. G02B 27/00; E06B 7/28
[52] U.S. Cl. ...................... 359/508; 359/509; 15/250.22; 52/171; 296/96.16
[58] Field of Search .................. 359/508, 509; 15/250.22, 250 R; 52/171; 296/96.16

[56] References Cited

U.S. PATENT DOCUMENTS

| 1,319,516 | 10/1919 | Drew | 296/96.16 |
|---|---|---|---|
| 1,340,025 | 5/1920 | De Normanville et al. | 296/96.16 |
| 3,103,712 | 9/1963 | Allinikov et al. | 52/171 |
| 3,347,004 | 10/1967 | Allen | 359/508 |
| 3,495,366 | 2/1970 | Allen | 359/508 |
| 3,688,081 | 8/1972 | Speich | 359/508 |
| 4,536,064 | 8/1985 | Schindel et al. | 359/508 |

FOREIGN PATENT DOCUMENTS

| 870794 | 3/1942 | France | 52/171 |
|---|---|---|---|
| 1160891 | 8/1958 | France | 15/250.22 |
| 555769 | 5/1958 | Italy | 296/96.16 |
| 1001878 | 10/1961 | United Kingdom | 52/171 |
| 900916 | 7/1962 | United Kingdom | 52/171 |

*Primary Examiner*—Jon W. Henry
*Attorney, Agent, or Firm*—Seed and Berry

[57] ABSTRACT

A rotating window mounted directly to one side of a stationary, viewing window or panel without the need to cut a hole in the stationary window. The rotating window faces toward the working or weather-exposed area and slings off any water or other debris that contacts the rotating window to maintain clear visibility through the stationary window. The rotating window further comprises a means for drawing air through the area in between the rotating window and the viewing window so that moisture does not collect on and fog up either window.

7 Claims, 3 Drawing Sheets

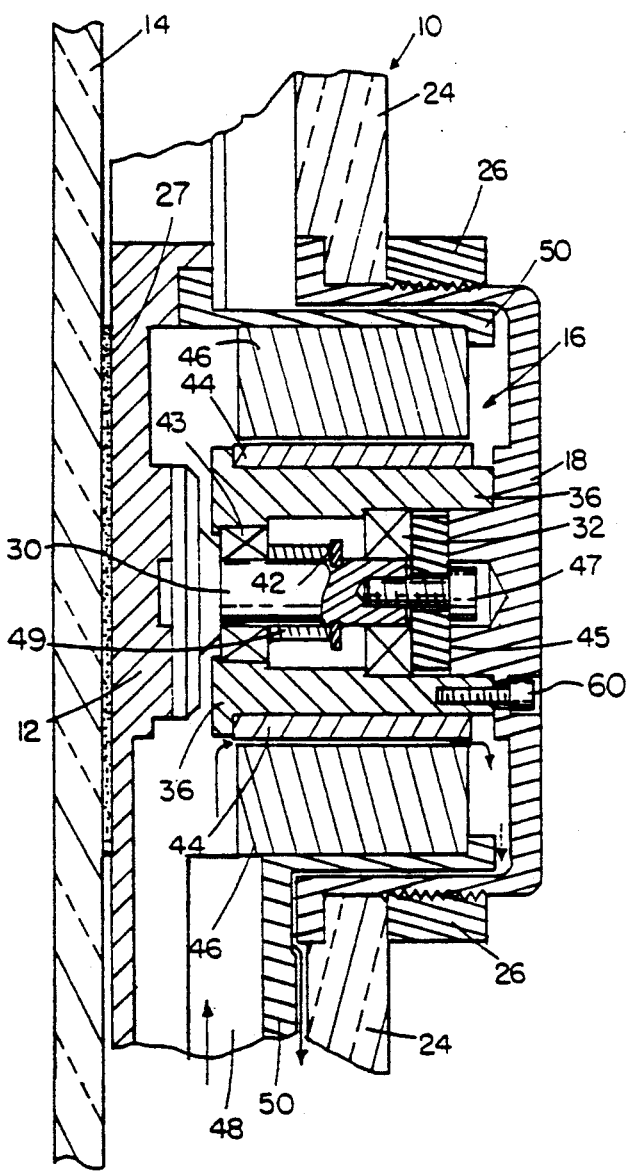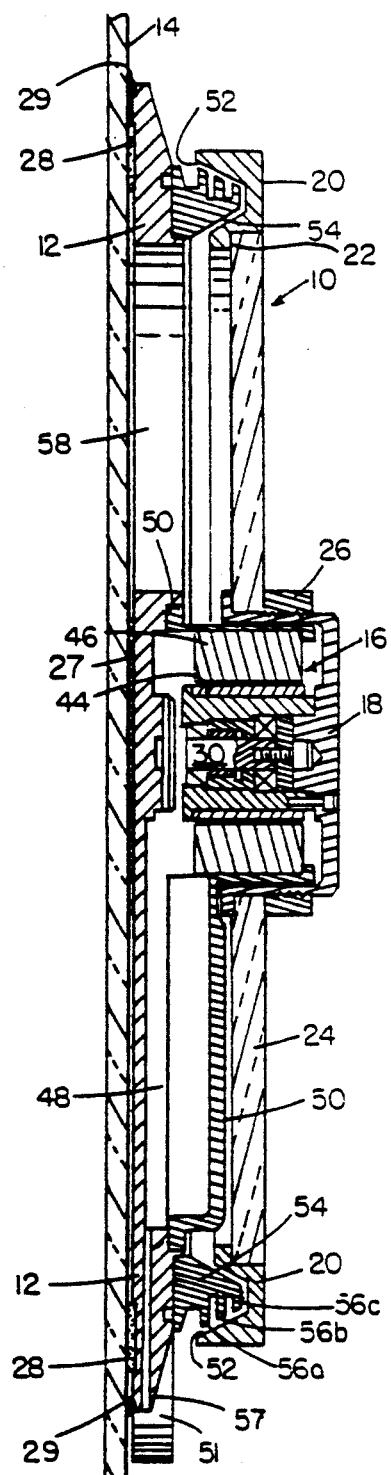
FIG. 4
FIG. 3

ROTATING WINDOW

TECHNICAL FIELD

This invention relates to vision improvement devices, and more specifically, to devices for maintaining clear visibility through viewing windows.

BACKGROUND OF THE INVENTION

The need for maintaining clear visibility through viewing windows has long been recognized, particularly in the automobile industry, the shipping industry, the tooling and machining industry, and in many other areas where clear visibility through a window is required.

Visibility through a viewing window is commonly impeded when, for example, water and other debris impacts the window. In the automotive and shipping industry, reciprocating wipers have been used to remove water and debris from windshields. Windshield wipers cannot, however, overcome the problem of water collecting on the windshield in between swipes of the wiper, regardless of the speed at which the wiper reciprocates.

In the machining and tooling industry, there is a need to maintain the window through which the work piece is viewed clear of coolant used in machining and scraps of metal and debris resulting from the machining process. Wire screens have been used to protect the window from flying pieces of debris. However, use of a screen tends to impede, rather than improve, visibility through the window.

In all of the above-mentioned applications, a need exists not only to maintain the viewing window free of water and other debris, but also to keep intact as much of the structural integrity of the viewing window as possible. Preferably, there should be no reduction in such structural integrity for safety reasons.

Rotating windows have been used to overcome some of the above-noted problems in the shipping and machining industry. A rotating window places a centrifugal force on any object that comes into contact with the window and slings the object immediately off the rotating window.

Prior known rotating windows suffer, however, from several drawbacks. First, traditional mounting techniques for windows have required that some type of a mounting hole be cut through the viewing window. This, of course, weakens the strength of the viewing window and creates safety concerns. Further, the bigger the rotating window, the bigger the hole must be and the weaker the viewing window becomes. Stress cracks commonly originate from the edges of such a mounting hole which further weaken the strength of the window.

Another problem with respect to known prior rotating windows is that they must typically be installed on an existing enclosure that has a stationary or viewing window. Such installation requires cutting a hole in the viewing window and mechanically securing the rotating window to the stationary window, which is labor intensive and therefore expensive. Further, holes cannot generally be cut into windows made of certain materials, such as glass that has already been tempered, and laminated safety glass.

Another problem associated with prior rotating windows is that they have a tendency to fog up. These prior rotating windows have one sheet of transparent material facing the area to be viewed that rotates and a second sheet of transparent material closest to the person looking through the rotating window. This second sheet is stationary and overlies the opening which has been cut in the larger viewing window. If moisture, such as from water or lubricants, enters into the area in between the two sheets of material, the transparent materials will fog up. The problem of moisture entering in between the sheets of material commonly arises when the rotating window has been deactuated.

A further problem created by prior rotating windows is that because they are mounted through holes, they create a tunnel-vision effect, from the length of cylindrical window housing, that restricts the angle of vision of the operator through the rotating window.

SUMMARY OF THE INVENTION

It is an object of the invention to provide a rotating window for maintaining a viewing window free from water and other debris.

Another object of the invention is to provide a rotating window that can be directly secured to a stationary window without the need of cutting a hole in the stationary window for installation.

Another object of the invention is to provide a rotating window that includes a means for creating a positive pressure to force air through an internal area between the rotating window and the stationary window to remove any moisture inside the internal area and prevent the windows from fogging up.

Still another object of the invention is to provide a rotating window that prevents water and moisture from entering in between the rotating window and the stationary window to prevent either window from fogging up.

Another object of the invention is to increase the viewing angle through the rotating window so that more of the work being performed within the enclosure can be viewed by the operator.

Another object of the present invention is to provide a unique seal in between the rotating window and the stationary window to prevent moisture and water from entering into an area in between the windows.

Yet another object of the invention is to provide a rotating window that is easy to install.

Another object of the invention is to provide a rotating window that can be manufactured relatively inexpensively.

These objects, as well as other objects that will become apparent from the detailed description of the invention that follows, are achieved by a rotating window mounted directly to one side of a stationary, viewing window without the need to cut a hole in the stationary window. The rotating window faces toward the working or weather-exposed area and slings off any water or other debris that contacts the rotating window to maintain clear visibility through the stationary window. The rotating window further comprises a means for drawing air through the area in between the rotating window and the viewing window so that moisture does not collect on and fog up either window.

BRIEF DESCRIPTION OF THE DRAWINGS

FIG. 3 is a sectional side elevational view, taken along line 3—3 of FIG. 2, of the rotating window.

FIG. 4 is a enlarged, partial side elevational view of the rotating window as shown in FIG. 3.

DETAILED DESCRIPTION OF THE INVENTION

The present invention comprises generally, as shown in FIGS. 1-4, a rotating window 10 rotatably coupled to a base member 12, which in turn is directly attached to one side of a viewing or stationary window 14. The stationary window is the type through which a person must ordinarily look through to view a work being performed. The rotating window 10 is rotatably driven by an electric motor means 16 which causes the window 10 to rotate at a high rate of speed and sling off objects that contact the window 10 due to the resulting centrifugal force. The main object of the rotating window 10 is to maintain clear visibility through a portion of the stationary window 14.

Figure 1:
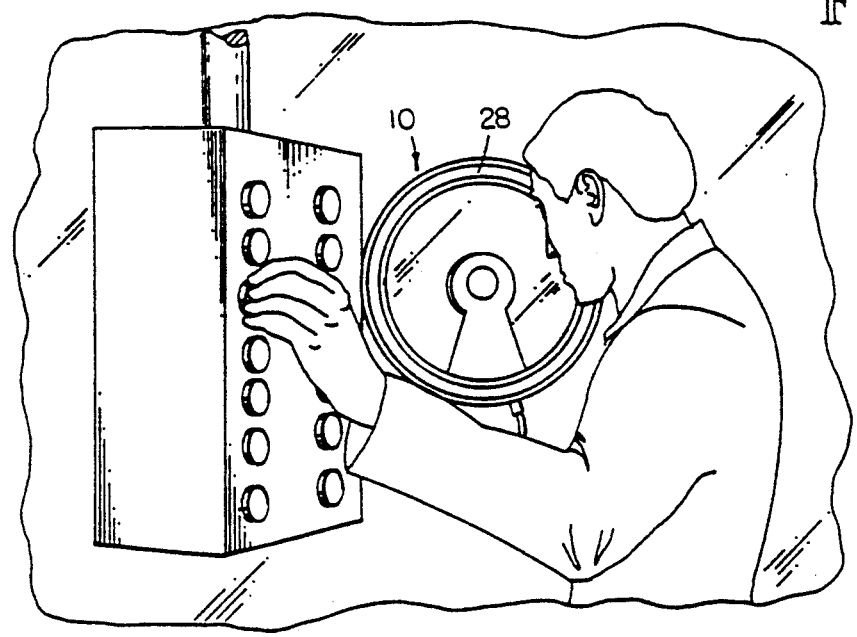
FIG. 1 is a perspective, environmental view of a rotating window.

With reference to FIG. 1, one environment in which the present invention is intended to be used is the machining and tooling industry. FIG. 1 shows a person looking through the rotating window 10 while operating a control panel for controlling machining or tooling that is taking place inside an enclosure having a viewing window 12. Clear vision through such a viewing window has traditionally been difficult, if not impossible, because the inside of the viewing window quickly becomes covered by oils, coolants, metal fragments, and other debris from the machining process.

Although FIG. 1 shows an operator looking through the rotating window 10 at the machining process taking place inside an enclosure, the present invention is also intended to be used on windshields for all types of vehicles, particularly ships and other aquatic vessels, to maintain clear vision through a viewing window or windshield. Additionally, the rotating window may be used to create a viewing port through a solid, nontransparent material such as sheet metal. In such an application, the rotating window would be secured to the sheet metal over a hole that is smaller than the rotating window. Further, the rotating window can be used on the outside of a transparent box through which a camera or person monitors any type of outdoor activity where exposure to adverse weather conditions, such as rain or snow, is possible.

Figure 2:
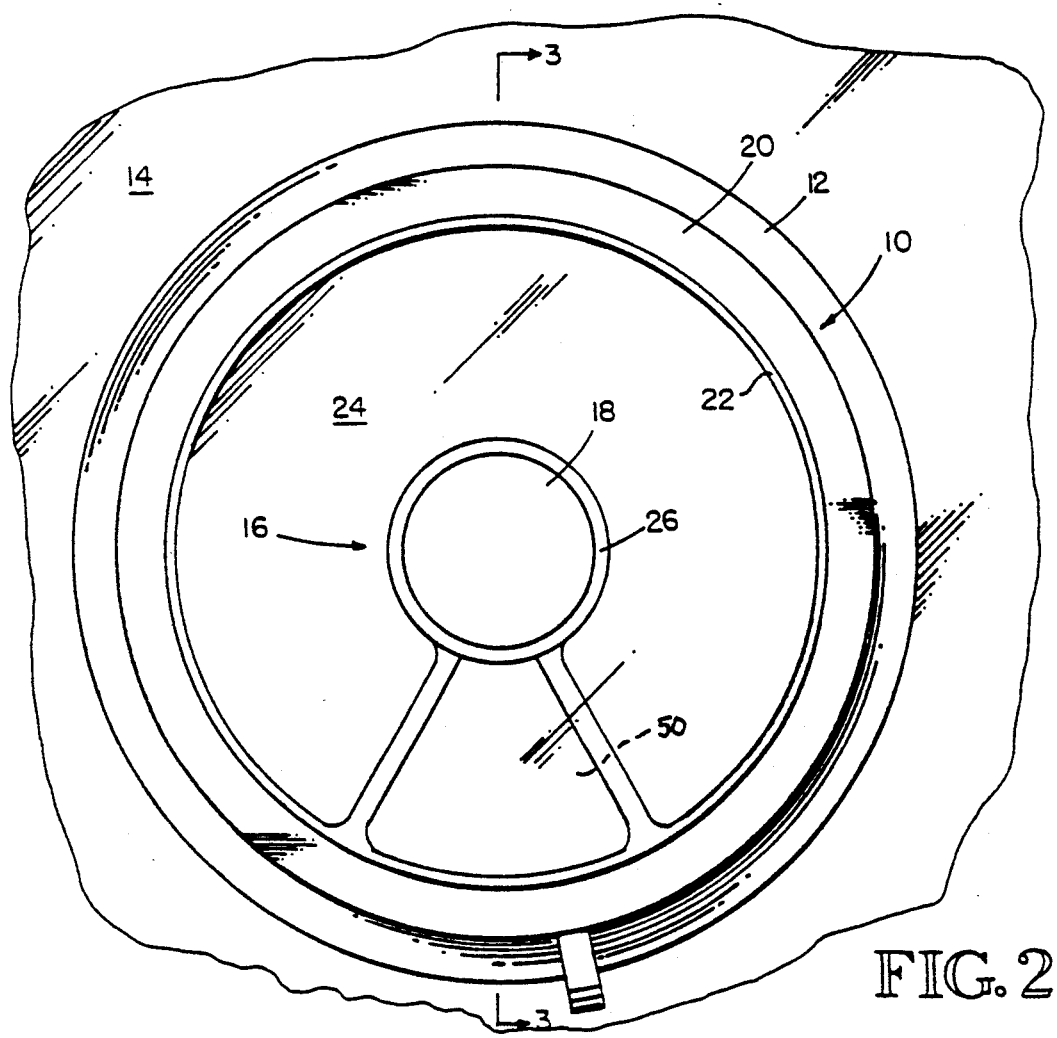
FIG. 2 is a front elevational view of the rotating window.

With reference to FIGS. 2-3, the rotating window 10 is rotatably coupled to a base member 12 at a central hub 18. The base member 22 is generally circular except for a pre-shaped section that extends upwardly from the lower portion of base member 12 (as shown in FIG. 2) terminates in a central circular portion that corresponds to the hub 18. A housing member 50 covers the major portion of the sector, as shown in FIGS. 2 and 3. Thus, the operator is able to see through the rotating window except for the areas corresponding to the base member 12, which includes portions behind housing member 50 and central hub 18.

The rotating window 10 comprises an annular frame member 20 having an interior annular shelf 22, and a transparent material 24, such as a polycarbonate material or piece of glass, which is inserted over the hub 18 and seats inside the shelf 22 of the frame member 20. The transparent material or glass 24 is secured to the hub 18 by a clamp ring 26. Although FIG. 3 shows the clamp ring 26 being threaded over the hub, it is understood that any conventional means may hold the clamp ring on the hub. Installation and removal of the rotating window 10 from the base 12 is accomplished by a plurality of mounting screws 60 (preferably three to six, although only one is shown in FIG. 4) which are inserted through the central hub 18 and threadedly received by the rotor hub 36. The glass 24 can be removed by removing the screws 36 to access the interior of the rotating window 10 so that, for example, the stationary window 14 can be cleaned. Since the hub 18 detaches from the rotor hub 36, the balance between the motor means 16 and the shaft 30 is not affected when the glass 24 is removed.

Referring now to FIGS. 3 and 4, the base member 12 is secured to the stationary window 14 by means of an adhesive material shown as a ring 28 and a center pad 27. Although the adhesive ring 28 and adhesive center pad 27 could be any suitable type of adhesive, one embodiment of the invention utilizes a double-sided, adhesive-backed tape comprising an acrylic, high-adhesion bonding material. A primary advantage of this securing method is that there is no need to cut a hole in the stationary window 14 in order to mount the rotating window 10. Thus, the structural integrity of the stationary window 14 remains unchanged. This is particularly important in tooling and machining applications where, for example, milling machines inside the enclosure constantly throw projectiles, such as coolant, oil, and chips and fragments of metal, toward the stationary, viewing window 14 of the enclosure. An O-ring seal 29 is placed around the outermost periphery of the base member 12 to prevent any fluids from contacting the adhesive ring 28 and possibly destroying its adhesion properties.

The rotating window 10 is coupled to the base member 12 by means of a shaft 30. A pair of ball bearings 32, 43 provide a means for allowing the rotating window 10 to rotate about the shaft 30. The ball bearing 43 is secured to the shaft 30 in-between the rotor hub 36 and the combination spacer 49 and snap ring 42. The ball bearing 32 is secured, in turn, to the shaft 30 in-between the rotor hub 36 and a safety washer 45, which is held in place by a screw 47 threadedly received by the shaft 30. The present mounting arrangement securely couples the rotating window 10 to the base member 12 without creating any gyro effects that would otherwise cause the rotating window to pivot relative to the stationary window if, for example, the rotating window were mounted to a hinged door being opened or closed during actuation of the rotating window.

Figure 5:
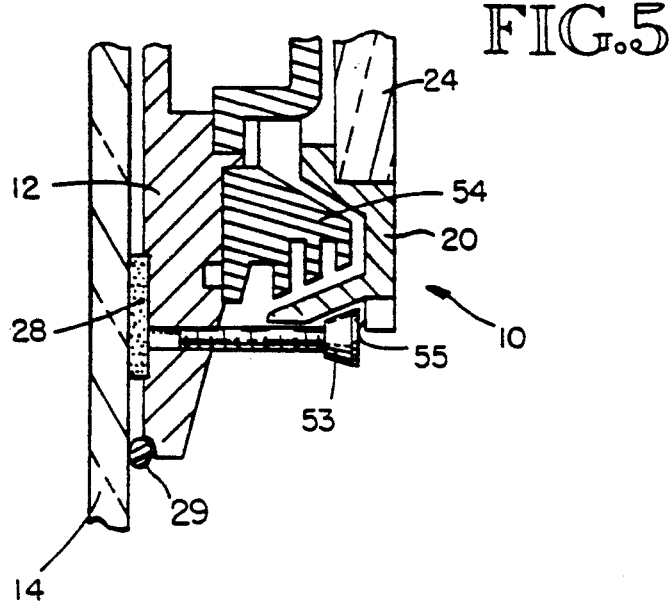
FIG. 5 is an alternative embodiment of a safety means for securing the rotating window to the stationary window.

With reference to FIG. 5, an alternative embodiment of the invention includes a safety means for preventing the rotating window 10 from being thrown from the base member 12 if, for some reason, the means for securing the rotating window 14 to the shaft 30 (FIG. 4) fails. This alternative embodiment comprises a plurality of safety posts 53 (only one is shown in FIG. 5) threadedly engaging the periphery of base member 12. The annular frame member 20 defines a peripheral groove 55 which corresponds in shape to the top of the safety post 53. During normal operation, the annular frame 20 will rotate unimpededly inside of the safety posts 53. If, however, the rotating window 10 becomes separated from the shaft 30, the heads of the safety posts 53 will engage the peripheral groove 55 and prevent the rotating window from being thrown away from the base member 12.

The safety posts 53 may also act as jack screws to lift and separate the base member 12 from the stationary window 14. As mentioned above, the sole means for securing the base member 12 to the window 14 is by the adhesive 28. The high-adhesion properties of this material make it extremely difficult to remove the base member 12 from the window 14 without damaging one or the other. Thus the safety posts 53, being located around the periphery of the base member 12, can be sequentially turned to completely pass through the base member 12 and engage the window 14 and gradually separate the base member 12 from the window 14.

The rotating window 10 can be actuated by any conventional means, such as by a conventional alternating current or direct current motor. The speeds at which the window 10 rotates depend primarily upon the diameter of the window, but the speeds commonly range from 2,000 RPM to 8,000 RPM. Typical diameters for the rotating window 10 are nine inches to twelve inches for tooling and machining applications, and from six inches to eighteen inches for marine applications.

In one embodiment, the rotating window is driven by an electric motor means 16 having multiple magnets 44 secured to the periphery of a rotor hub 36 opposite a stack 46. When power is supplied to the motor, the hub 36 and magnets 44 rotate relative to the stack 46.

The electronics (not shown) which actuate the power to the motor means 16 can be housed in space 48 defined by the base member 12 and a housing member 50. It is understood, however, that the electronics could also be located separate from the rotating window 10 without departing from the scope of the present invention. It is also understood that any suitable, conventional electronics could be utilized in the present invention. Lead wires (not shown) pass into the space 48 via a conduit 51 coupled directly to the housing member 50.

With reference to FIG. 3, the annular frame member 20 of the rotating window 10 includes an annular channel 52. The shape of the channel 52 corresponds to the shape of a labyrinth 54 which extends perpendicularly outwardly of the annular frame member 20 to create a seal between the rotating window and the base member 12. The labyrinth 54 includes a plurality of annular flanges 56a, 56b, 56c which extend radially outwardly of the labyrinth.

The purpose of the labyrinth 54 is to reduce the likelihood that liquid, such as water or coolant, will enter into an area 58 in between the rotating window 10 and the stationary window 14 which could cause the windows to fog up. For water to enter into area 58, it would have to pass sequentially over the flanges 56a, 56b, and 56c, respectively, and the channels therebetween before entering into area 58. The labyrinth 54 prevents water or coolant for passing into the internal area 58 whether or not the rotating window 10 is revolving. If, for some reason, liquid enters into the area 58, a drain hole 57 is provided in the base member 12 to allow the liquid to drain by gravity to the outside of the rotating window 10.

Referring now to FIG. 4, another function of the conduit 51, other than to house the lead wires, is to provide a means for ambient air to pass through the rotating window so that moisture can be removed to prevent the stationary window and the rotating window from fogging up. Ambient air enters into the conduit 51 and passes into space 48, between the magnet 44 and the stack 46, between the housing member 50 and the hub 18, between the transparent material 24 and the stationary window 14, and finally exit by passing between the labyrinth 54 and an the annular frame member 20. The above-described direction of air flow is shown by the arrows in FIG. 4. A positive pressure is created when the rotating window rotates which draws air into the conduit 51. It is also understood that air could be forced through the conduit 51 to remedy a severe fogging problem.

Figure 7:
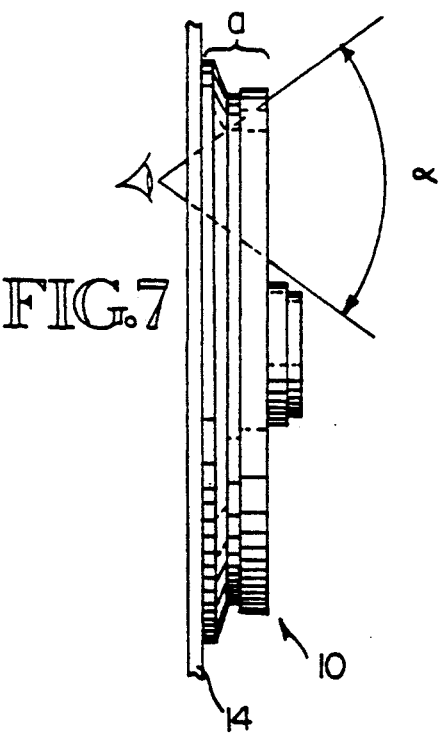
FIG. 7 is a side elevational view of the rotating window showing.. the angle of view through the rotating window.
Figure 6:
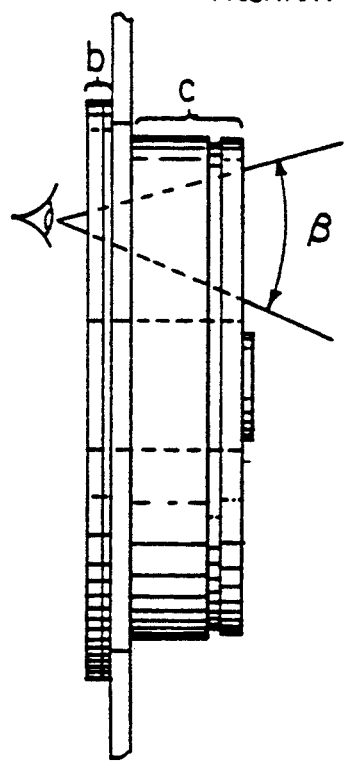
FIG. 6 is a side elevational view of a prior art window.

Referring now to FIGS. 6 and 7, another feature of the present invention is that is provides an increased angle of view through the rotating window. FIG. 7 shows the present invention wherein the rotating window 10 is secured directly to one side of the stationary window 14 without the need to cut a hole in the window. The total thickness a of the rotating window (i.e., the cross-sectional dimension of the rotating window from the outer surface of the glass 24 to the side of the base member 12 adjacent of the stationary window 14 as shown in FIG. 5) is approximately one inch. The combination of the minimal thickness and the mounting of the rotating window 10 to one side only of the stationary window results in an increased viewing angle $\alpha$. This, of course, allows the operator to view more of the work being performed within the enclosure.

FIG. 6 shows a prior art rotating window mounted through a hole in a stationary window. This mounting arrangement requires that a width b of the rotating window be located on one side of the window and a second width located on the opposite side of the stationary window. The combination of widths a, b (approximately four inches total) create a tunnel through which the operator must look to see the work being performed. The result is a restricted angle of view $\beta$ as compared to the present invention.

From the foregoing, it will be appreciated that, although specific embodiments of the invention have been shown and described herein for purposes of illustration, various modifications may be made without departing from the spirit and scope of the invention. Therefore, the invention is not to be limited to specific embodiments shown in the drawings.

I claim:

1. A device for maintaining clear visibility through a stationary, viewing window at which liquid or debris are projected, comprising:

a base member adapted to be mounted directly to one side of a stationary window;

a rotating window rotatably coupled to said base member and having a peripheral groove;

means for securing said base member to only said one side of said stationary window, said securing means contacting only said one side of said stationary window such that there is no need of a hole in said stationary window to mount the base member to said stationary window and complete structural integrity of the stationary window is therefore maintained;

means for rotating the rotating window to sling off any water or debris that comes in contact with said rotating window; and safety means for preventing the rotating window from being thrown from the base member in the event the rotating window becomes rotatably disconnected from the base member, said safety means comprising a plurality of screws secured to the base member around the periphery of the rotating window, each screw having a head corresponding to said peripheral groove in the rotating window such that during normal operation, the rotating window rotates unimpededly inside of the screws, but in the event the rotating window becomes rotatably disconnected from the base member, the screw heads engage the peripheral groove to prevent the rotating window from being thrown away from the base member.

2. A device for maintaining clear visibility through a stationary, viewing window at which liquid or debris are projected, comprising:

a base member adapted to be mounted directly to only one side of a stationary window;

a rotating window rotatably coupled to said base member and having a peripheral groove;

means for securing said base member to said stationary window;

means for rotating the rotating window to sling off any water or debris that comes in contact with said rotating window;

means for causing air to flow through an area in between said rotating window and said stationary window to prevent said rotating window and said stationary window from fogging up from moisture that enters into said area in between said rotating window and said stationary window, and safety means secured to the base member around the periphery of the rotating window for preventing the rotating window from being thrown from the base member in the event the rotating window becomes rotatably disconnected from the base member, said safety means comprising a plurality of screws, each screw having a head corresponding to a peripheral groove in the rotating window such that during normal operation, the rotating window rotates unimpededly insides of the screws, but in the event the rotating window becomes rotatably disconnected from the base member, the screw heads engage the peripheral groove to prevent the rotating window from being thrown away from the base member.

3. A device for maintaining clear visibility through a stationary viewing window at which liquid or debris are projected, comprising:

a base member adapted to be mounted directly to one side of a stationary window, said base member comprising generally an outer annular portion and a single sector extending radially inwardly of the annular portion and terminating in a circular, central hub portion;

a rotating window rotatably coupled to said base member only at said hub portion;

means for securing said base member to said stationary window; and means for rotating said rotating window relative to said base member to sling off any water or debris that comes into contact with said rotating window.

4. A device according to claim 3, further comprising sealing means in the form of a laybyrinth for sealing the area in between the rotating window and said annular portion of the base member to prevent liquid or debris from entering into an area in between said rotating window and said stationary window, even when the rotating window is deactuated, to prevent the rotating window and the stationary window from fogging up.

5. A device according to claim 4, further comprising means for causing air to flow through an area in between said rotating window and said stationary window to remove moisture nd thus prevent said rotating window and said stationary window from fogging up.

6. A device according to claim 3 in which said means for rotating said rotating window comprises an electric motor mounted on said central hub portion and arranged to directly drive said rotating window.

7. A device according to claim 3 or claim 6 in which said means for securing said base member to said stationary window comprises double-sided, adhesive-backed material bonded to said annular portion and to said hub portion.

* * * * *

UNITED STATES PATENT AND TRADEMARK OFFICE
CERTIFICATE OF CORRECTION

PATENT NO. : 5,161,055

DATED : November 3, 1992

INVENTOR(S) : Wolf J. Biechschmidt

It is certified that error appears in the above-identified patent and that said Letters Patent is hereby corrected as shown below:

In column 7, claim 2, line 41, please delete "insides" and substitute therefor --inside--.

In column 8, claim 4, line 22, please delete "laybyrinth" and substitute therefor --labyrinth.

In column 8, claim 5, line 32, please delete "nd" and substitute therefor --and--.

Signed and Sealed this

Fifth Day of October, 1993

*Attest:*

BRUCE LEHMAN

*Attesting Officer*  Commissioner of Patents and Trademarks